UNITED STATES PATENT OFFICE 2,479,996

SYNTHESIS OF ORGANIC SULFUR COMPOUNDS

Richmond T. Bell and Carlisle M. Thacker, Highland Park, Ill., assignors to The Pure Oil Company, Chicago, Ill., a corporation of Ohio No Drawing. Application December 13, 1943, Serial No. 514,160

19 Claims. (Cl. 260—609)

This invention relates to preparation of mercaptans and alkyl sulfides by reaction of olefins with hydrogen sulfide.

One of the objects of the invention is to provide a method for preparing mercaptans.

Another object of the invention is to provide a method for preparing alkyl sulfides.

Further objects of the invention will become manifest from the following description.

Although we have found that boron trifluoride and hydrogen fluoride catalyze the reaction of olefins and hydrogen sulfide to mercaptans and alkyl sulfides, we have found that the combination of anhydrous hydrogen fluoride and anhydrous boron trifluoride is more effective than either hydrogen fluoride or boron trifluoride over a wide range of temperature, as for example 200° C. to approximately —35° C. It is possible that hydrogen fluoride and boron trifluoride in various proportions may react to form hydrogen borofluorides and for purposes of brevity the catalyst may be referred to as hydrogen borofluoride, but it is to be understood that whenever the term is used it indicates either compounds or mixtures of hydrogen fluoride and boron trifluoride.

Our invention is directed to the preparation of mercaptans and alkyl sulfides from olefins such as ethylene, propylene, butenes, pentenes, octenes and dodecenes. Mercaptans prepared according to our invention are useful in the synthesis of alkylated benzene, in the preparation of synthetic rubber and for other known uses for mercaptans and alkyl sulfides.

The process of preparing mercaptans and alkyl sulfides in accordance with our invention may be carried out either in a batch or continuous system. Where a continuous system is used, the catalyst may be mixed in the desired proportion with the reaction gas and/or liquid and passed through a reaction chamber or coil maintained at the desired temperature. For example, an olefin in the vapor phase may be mixed with catalyst and hydrogen sulfide and passed through a reactor maintained at the temperature desired to effect reaction. Effluent products may be cooled and unreacted olefin and catalyst separated for recycle by distillation and/or extraction.

When a liquid olefin is charged, it may be mixed with catalyst at the top of a packed tower maintained at reaction temperature and containing hydrogen sulfide at a desired perssure. The packed tower gives intimate contact between hydrogen sulfide and the olefin-catalyst mixture, and agitation may be achieved by circulating the liquid from the bottom of the tower back into the top of the tower. Hydrogen sulfide in amount sufficient to maintain the desired pressure is added to the system as it is consumed. The mixture of products, catalyst, and unreacted olefins may be continuously withdrawn from the circulating stream at the bottom of the tower, and mercaptans and alkyl sulfides may be recovered by conventional methods of distillation and/or extraction. Recovered catalyst and unreacted olefin may be returned to the system as recycle charging stock.

Contact times ranging from a few minutes to several hours may be used. Shorter reaction periods are conducive to smaller percentage yields.

Where a static or batch method of preparation is resorted to, the reaction vessel may be charged with a desired amount of catalyst, olefin and hydrogen sulfide and allowed to stand for a period of time ranging from several minutes to several days, after which the reaction may be at equilibrium and the mercaptans and alkyl sulfides recovered from the reaction products.

The hydrogen fluoride and boron trifluoride may each be used in amounts ranging from approximately 5 mole per cent of the olefin to as high a concentration as is economically feasible. Reaction, whether batch or continuous, may be carried out at pressures ranging from atmospheric to 500 pounds per square inch or more. We have found that pressures of 100 to 200 pounds per square inch are satisfactory.

The ratio of hydrogen sulfide to olefins which may be charged to the process may vary widely. A ratio of one to ten moles of hydrogen sulfide to one mole of olefin is preferable where it is desired to form mercaptans. A ratio of one to one-tenth mole of hydrogen sulfide to one mole of olefin is preferable where it is desired to form sulfides. Comparatively low temperatures and/or short contact times favor the formation of mercaptans whereas comparatively high temperatures and/or long contact times favor the formation of sulfides. Longer contact times result in greater yields of both mercaptans and alkyl sulfides.

The reaction of hydrogen sulfide with olefin to form mercaptan proceeds much more rapidly as the olefin increases in molecular weight. Yields of 75% of theoretical are easily obtainable with triisobutylene. As previously pointed out, lower temperatures tend to suppress the formation of sulfides and favor the formation of mercaptans. In the case of ethylene in a static or batch operation, temperatures of about 0° to 25° C. have been found to give the highest yields of mercaptans. As the olefin increases in molecular weight, lower temperatures may be used because of the fact that the reaction is more rapid with higher boiling olefins.

In order to demonstrate the efficacy of mixtures of hydrogen fluoride and boron trifluoride as catalysts, a number of static runs were made using hydrogen fluoride, boron trifluoride and a mixture of equal mole proportions of hydrogen fluoride and boron trifluoride. A run was also made without catalyst. The runs were made in a bomb having a capacity of 850 cc. and were carried out at pressures ranging from 100 to 200 pounds per square inch. In making the runs, the bomb was swept out with nitrogen gas prior to charging the catalyst and the reactants. After the catalyst and reactants were charged to the bomb in desired proportions, the bomb was allowed to stand until pressure readings, which were observed approximately every hour, decreased at a rate of less than ½ pound per hour, or if the pressure had dropped considerably, more hydrogen sulfide and ethylene were charged and the run allowed to continue until the rate of pressure decrease was about ½ pound per hour or less.

In the following table the runs indicated as having been made at a temperature of 25° C. were all made at room temperature, so that temperature of the runs varied from about 21 to 27° C. The runs made at 0° C. were made in an icebox and the runs made at −35° C. were made by using dry ice and a kerosene bath.

In the early runs, up to run E-31, the reaction gases discharged from the bomb were allowed to pass in a fine dispersion through a long column of water (600 cc.) topped with 100 cc. of decalin in order to absorb hydrogen sulfide and mercaptans from the gas stream. The reaction bomb was water-washed and extracted with decalin. The decalin is used to absorb the mercaptans and sulfides. After run E-31 a column of aqueous sodium carbonate solution topped with solvent naphtha (Stoddard solvent) was used, since it was found that the sodium carbonate solution would substantially completely remove the hydrogen sulfide without appreciable effect upon the mercaptan content, and the Stoddard solvent would absorb mercaptans and sulfides. Mercaptan sulfur was determined by the silver nitrate method and sulfide sulfur was determined by the bromine water method.

The following table gives results obtained on the different runs carried out. In the first six runs listed in the table, the reactants were held at a temperature of 100° C. for a period of 6 or 7 hours and then held at room temperature for a further period of time. The runs are presented in groups in order to facilitate comparison of the results obtained with hydrogen fluoride, boron trifluoride, and a mixture of hydrogen fluoride and boron trifluoride.

| Run No. | HF | BF$_3$ | H$_2$S | C$_2$H$_4$ | Temp., °C. | Contact Time, Hrs. | Yield Percent of Theoretical | |
|---|---|---|---|---|---|---|---|---|
| | | | | | | | Mercaptan Sulfur | Alkyl Sulfide Sulfur |
| E-68 | 0.10 | 0.00 | 0.16 | 0.16 | 100 / 25 | 6 / 26 | 0.4 | 0.0 |
| E-35 | 0.00 | 0.11 | 0.10 | 0.10 | 100 / 25 | 6 / 26 | 9.8 | 1.8 |
| E-46 | 0.10 | 0.09 | 0.21 | 0.21 | 100 / 25 | 6 / 45 | 2.9 | 18.8 |
| E-55 | 0.10 | 0.00 | 0.20 | 0.10 | 100 / 25 | 6 / 17 | 0.4 | 0.0 |
| E-56 | 0.00 | 0.11 | 0.13 | 0.07 | 100 / 25 | 6 / 17 | 6.8 | 1.4 |
| E-57 | 0.10 | 0.11 | 0.14 | 0.07 | 100 / 25 | 7 / 17 | 8.1 | 1.4 |
| E-12 | 0.00 | 0.00 | 0.09 | 0.09 | 25 | 1,296 | 0.2 | |
| E-25 | 0.10 | 0.00 | 0.15 | 0.15 | 25 | 68 | 0.5 | 1.8 |
| E-102 | 0.00 | 0.11 | 0.13 | 0.13 | 25 | 68 | 10.4 | 0.5 |
| E-38 | 0.10 | 0.10 | 0.24 | 0.24 | 25 | 92 | 9.1 | 5.2 |
| E-97 | 0.10 | 0.00 | 0.26 | 0.13 | 25 | 75 | 3.0 | |
| E-93 | 0.00 | 0.09 | 0.18 | 0.09 | 25 | 5 | 5.0 | 2.1 |
| E-79 | 0.10 | 0.11 | 0.18 | 0.09 | 25 | 5 | 16.2 | 2.9 |
| E-73 | 0.10 | 0.00 | 0.20 | 0.20 | 0 | 18 | 0.3 | 0.0 |
| E-74 | 0.00 | 0.11 | 0.18 | 0.18 | 0 | 18 | 3.9 | 0.0 |
| E-75 | 0.10 | 0.11 | 0.17 | 0.17 | 0 | 18 | 17.7 | 1.3 |
| E-88 | 0.10 | 0.00 | 0.24 | 0.12 | 0 | 18 | 0.7 | 0.6 |
| E-89 | 0.00 | 0.10 | 0.21 | 0.10 | 0 | 17 | 5.5 | 2.9 |
| E-90 | 0.10 | 0.11 | 0.26 | 0.12 | 0 | 18 | 9.9 | 1.5 |
| E-54 | 0.15 | 0.00 | 0.45 | 0.45 | −35 | 9 | 0.2 | 0.0 |
| E-52 | 0.00 | 0.11 | 0.43 | 0.43 | −35 | 9 | 1.5 | 0.6 |
| E-53 | 0.10 | 0.13 | 0.68 | 0.68 | −35 | 9 | 2.3 | 0.3 |

By comparison of the results obtained on the three catalysts, particularly at 0° C., it will be observed that an unusual increase in yield of mercaptan was obtained using approximately equal mole proportions of hydrogen fluoride and boron trifluoride as catalyst.

Although in the runs in which a combination of anhydrous hydrogen fluoride and anhydrous boron trifluoride was used, the mole proportions of boron trifluoride and hydrogen fluoride were approximately equal, it is to be understood that it is not necessary to use equal mole proportions of the two but that a mole excess of one over the other may be used.

We claim:

1. A method for preparing mercaptans and alkyl sulfides comprising contacting an olefin with hydrogen sulfite in the presence of boron trifluoride and hydrogen fluoride.

2. Method in accordance with claim 1 in which the contact occurs at a temperature of approximately −35° C. to 200° C.

3. Method in accordance with claim 1 in which the contact occurs at a temperature of approximately −35° C. to 25° C.

4. Method in accordance with claim 1 in which the olefin and hydrogen sulfide are contacted in a mole ratio of 1 to 10 to a ratio of 10 to 1.

5. Method in accordance with claim 1 in which the olefin and hydrogen sulfide are contacted in a mole ratio of approximately 1 to 1.

6. A method for preparing mercaptans which comprises contacting an olefin with hydrogen sulfide in a mole ratio equal to approximately 1 to 1 at a temperature of approximately −35 to 100° C. in the presence of a mixture of boron trifluoride and hydrogen fluoride.

7. Method in accordance with claim 6 in which the boron trifluoride and hydrogen fluoride are present in approximately equal mole proportions.

8. A method for preparing mercaptans which comprises contacting olefins with hydrogen sulfide in the presence of a mixture of hydrogen fluoride and boron trifluoride at temperatures from −35° to 200° C., the hydrogen sulfide being present in an amount in excess of that necessary to react with the olefins to form mercaptans.

9. Method in accordance with claim 1 in which the olefin is ethylene.

10. Method in accordance with claim 1 in which the olefin contains 8 carbon atoms.

11. The method of preparing mercaptans comprising subjecting to reaction temperature a mixture consisting of olefin-containing hydrocarbons and hydrogen sulfide, in the presence only of the catalyst resulting from mixing together boron trifluoride and hydrogen fluoride.

12. Method in accordance with claim 11 in which the reaction temperature is between −35° C. and 100° C.

13. Method in accordance with claim 11 in which the boron trifluoride and hydrogen fluoride are each added to the reaction mixture in amounts not less than about 5 mole percent.

14. A method for preparing ethyl mercaptan comprising reacting ethylene and hydrogen sulfide in the presence of boron trifluoride and hydrogen fluoride.

15. Method in accordance with claim 14 in which the reaction is conducted at approximately 0–25° C.

16. Method in accordance with claim 14 in which the mole ratio of hydrogen sulfide to ethylene is not less than 1 to 1.

17. A method for preparing ethyl mercaptan comprising reacting ethylene and hydrogen sulfide at temperatures of approximately 0–25° C. and under superatmospheric pressure in the presence of boron trifluoride and hydrogen fluoride, the molal ratio of hydrogen sulfide to ethylene being not less than 1 to 1.

18. In the manufacture of mercaptans, the process comprising condensing an aliphatic olefinic hydrocarbon with hydrogen sulfide by contacting said olefinic compound with said hydrogen sulfide in fluid state in the presence of boron fluoride and hydrogen fluoride.

19. A method of preparing ethyl mercaptan comprising, reacting ethylene and hydrogen sulfide at temperatures of about 20° C., and under superatmospheric pressure in the presence of boron trifluoride and hydrogen fluoride, using a molal excess of hydrogen sulfide over ethylene.

RICHMOND T. BELL.
CARLISLE M. THACKER.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,183 | Nisson | Dec. 15, 1931 |
| 2,051,806 | Allen | Aug. 25, 1936 |
| 2,052,268 | Williams | Aug. 25, 1936 |
| 2,101,096 | Reuter | Dec. 7, 1937 |
| 2,173,482 | Keunecke | Sept. 19, 1939 |
| 2,296,399 | Otto | Sept. 22, 1942 |
| 2,352,435 | Hoeffelman | June 27, 1944 |
| 2,366,453 | Meadow | Jan. 2, 1945 |

Certificate of Correction

Patent No. 2,479,996                                                  August 23, 1949

RICHMOND T. BELL ET AL.

It is hereby certified that errors appear in the printed specification of the above numbered patent requiring correction as follows:

Column 4, line 59, for "sulfite" read *sulfide*; column 5, line 35, for "wtih" read *with*;

and that the said Letters Patent should be read with these corrections therein that the same may conform to the record of the case in the Patent Office.

Signed and sealed this 17th day of January, A. D. 1950.

[SEAL]

THOMAS F. MURPHY,
                                                             *Assistant Commissioner of Patents.*